(12) United States Patent
Wong et al.

(10) Patent No.: US 10,190,499 B2
(45) Date of Patent: Jan. 29, 2019

(54) AXIAL TENSION SYSTEM FOR A GAS TURBINE ENGINE CASE

(71) Applicant: United Technologies Corporation, Hartford, CT (US)

(72) Inventors: Joey Wong, Enfield, CT (US); Zhijun Zheng, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 654 days.

(21) Appl. No.: 14/649,064

(22) PCT Filed: Dec. 27, 2013

(86) PCT No.: PCT/US2013/077981
§ 371 (c)(1),
(2) Date: Jun. 2, 2015

(87) PCT Pub. No.: WO2014/106045
PCT Pub. Date: Jul. 3, 2014

(65) Prior Publication Data
US 2015/0369131 A1  Dec. 24, 2015

Related U.S. Application Data

(60) Provisional application No. 61/746,756, filed on Dec. 28, 2012.

(51) Int. Cl.
*F02C 7/20* (2006.01)
*F01D 25/24* (2006.01)
*F01D 25/16* (2006.01)

(52) U.S. Cl.
CPC .............. *F02C 7/20* (2013.01); *F01D 25/162* (2013.01); *F01D 25/24* (2013.01); *F05D 2250/711* (2013.01); *F05D 2260/30* (2013.01)

(58) Field of Classification Search
CPC .......... F02C 7/20; F01D 25/162; F01D 25/24; F01D 25/14; F01D 25/243; F01D 25/26;
(Continued)

(56) References Cited

U.S. PATENT DOCUMENTS 2,591,399 A    4/1952  Buckland et al.
2,934,316 A  *  4/1960  Watson ................. F01D 25/265
                                                        415/136
(Continued)

FOREIGN PATENT DOCUMENTS

EP    1473441 A2    11/2004
EP    2230386 A2     9/2010
(Continued)

OTHER PUBLICATIONS

Extended European Search Report for EP Application No. 13869591.1, dated Feb. 22, 2016, 8 pages.
(Continued)

*Primary Examiner* — Richard A Edgar
*Assistant Examiner* — Danielle M. Christensen
(74) *Attorney, Agent, or Firm* — Kinney & Lange, P.A.

(57) ABSTRACT

A gas turbine engine includes a convex case section. The convex case section includes an upstream case portion having a first radius, a downstream case portion having a second radius, and an intermediate case portion between the upstream case portion and the downstream case portion. The intermediate case portion has a third radius larger than the first radius and the second radius. A tension rod extends from the upstream case portion to the downstream case portion.

19 Claims, 8 Drawing Sheets

(58) Field of Classification Search
CPC .............. F01D 25/265; F05D 2260/30; F05D 2250/711
See application file for complete search history.

(56) References Cited

U.S. PATENT DOCUMENTS

| | | | |
|---|---|---|---|
| 3,327,473 A | | 6/1967 | Smith |
| 4,150,802 A | * | 4/1979 | Evelyn .................. B64D 29/00 244/54 |
| 5,017,088 A | | 5/1991 | Miraucourt et al. |
| 6,173,566 B1 | * | 1/2001 | Boeck ...................... F02C 7/04 415/213.1 |
| 6,881,029 B2 | | 4/2005 | Le Biez et al. |
| 2012/0060509 A1 | * | 3/2012 | Myoren ................... F02C 9/18 60/785 |

FOREIGN PATENT DOCUMENTS

| | | |
|---|---|---|
| JP | 2004245460 A | 9/2004 |
| WO | 2004076820 A1 | 9/2004 |
| WO | 2012025690 A2 | 3/2012 |

OTHER PUBLICATIONS

International Searching Authority, Notification of Transmittal of the International Search Report and Written Opinion, dated Apr. 8, 2014, 12 pages.

\* cited by examiner

AXIAL TENSION SYSTEM FOR A GAS TURBINE ENGINE CASE

CROSS-REFERENCE TO RELATED APPLICATION(S)

This application is a U.S. national stage application of PCT International Application No. PCT/US2013/077981, filed Dec. 27, 2013 (designating the United States), which claims priority from U.S. Provisional Application No. 61/746,756, filed Dec. 28, 2012.

BACKGROUND

The present invention relates to gas turbine engines, and in particular, to cases for gas turbine engines.

Gas turbine engines typically include one or more compressor sections, a combustor section, and one or more turbine sections. Gas flows through such gas turbine engines along a main flow path from the compressor sections where the gas is compressed, through the combustor where the gas is mixed with fuel and combusted, and then through the turbine sections where power is extracted from the gas. Operation of gas turbine engines creates a number of loads on various engine components. For example, gas turbine engines include a case that surrounds the compressor, combustor, and turbine sections and that can be subjected to loads in the radial, circumferential, and axial directions. If a case has insufficient strength and stiffness, components of the gas turbine engine can be damaged.

SUMMARY

A gas turbine engine includes a convex case section. The convex case section includes an upstream case portion having a first radius, a downstream case portion having a second radius, and an intermediate case portion between the upstream case portion and the downstream case portion. The intermediate case portion has a third radius larger than the first radius and the second radius. A tension rod extends from the upstream case portion to the downstream case portion.

Another embodiment is gas turbine engine including a case extending circumferentially around the gas turbine engine and a tension rod. The case includes a bulge section. The tension rod has a first end connected to an upstream portion of the bulge section and a second end connected to a downstream portion of the bulge section.

DETAILED DESCRIPTION

Figure 1A:
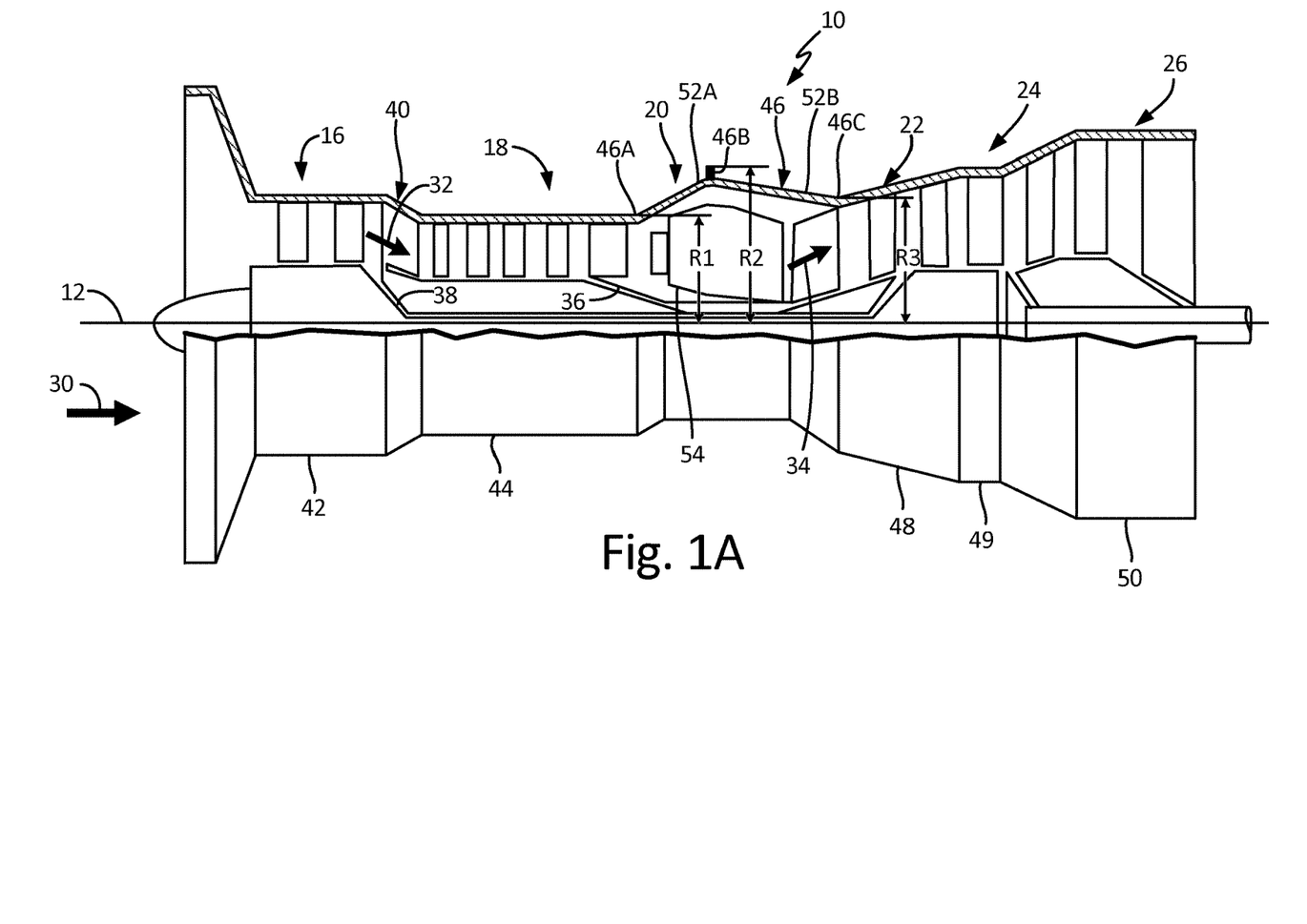
FIG. 1A is a side sectional schematic view of an industrial gas turbine engine having a case with a first embodiment of a case section with a convex bulge.

FIG. 1A is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes in series order from front to rear, low pressure compressor section 16, high pressure compressor section 18, combustor section 20, high pressure turbine section 22, and low pressure turbine section 24. In some embodiments, power turbine section 26 is a free turbine section rotating independently from and disposed downstream of both high pressure turbine section 22 and low pressure turbine section 24. Power turbine section 26 may, for example, drive an electrical generator, pump, or gearbox (not shown).

As is known in the art of gas turbines, incoming ambient air 30 becomes pressurized air 32 in the low and high pressure compressor sections 16 and 18. Fuel mixes with pressurized air 32 in combustor section 20, where it is burned. Once burned, combustion gases 34 expand through high and low pressure turbine sections 22, 24 and through power turbine section 26. High and low pressure turbine sections 22 and 24 drive high and low pressure rotor shafts 36 and 38 respectively, which rotate in response to the combustion products and thus rotate the attached high and low pressure compressor sections 18, 16.

Case 40 is an engine case extending circumferentially around low pressure compressor section 16, high pressure compressor section 18, combustor section 20, high pressure turbine section 22, low pressure turbine section 24, and power turbine section 26. Case 40 covers and provides structural support for low pressure compressor section 16, high pressure compressor section 18, combustor section 20, high pressure turbine section 22, low pressure turbine section 24, and power turbine section 26. Case 40 can be divided into a number of case sections. In the illustrated embodiment, case 40 can be divided into low pressure compressor case section 42, high pressure compressor case section 44, combustor case section 46, high pressure turbine case section 48, low pressure turbine case section 49, and power turbine case section 50, each structurally connected in series.

In the illustrated embodiment, combustor case section 46 is a convex case section and can also be described as a bulge section. In the illustrated embodiment, combustor case section 46 is also a diffuser case. Combustor case section 46 includes upstream case portion 46A, intermediate case portion 46B, and downstream case portion 46C. Intermediate case portion 46B is positioned between upstream case portion 46A and downstream case portion 46C. Intermediate case portion 46B has radius R2 with respect to engine centerline axis 12 that is larger than radius R1 of upstream case portion 46A and radius R3 of downstream case portion 46C. Combustor case section 46 is a combination of two discrete conical cases 52A and 52B that join at intermediate case portion 46B. Combustor case section 46 bulges to create additional space in combustor section 20, allowing for combustor section 20 to be relatively large as compared to prior art gas turbine engines without a case having a bulge. This additional space in combustor section 20 creates room for a plurality of discrete cylindrical combustors 54. In an alternative embodiment, the plurality of discrete cylindrical combustors 54 can be replaced with an annular combustor (not shown).

Figure 1B:
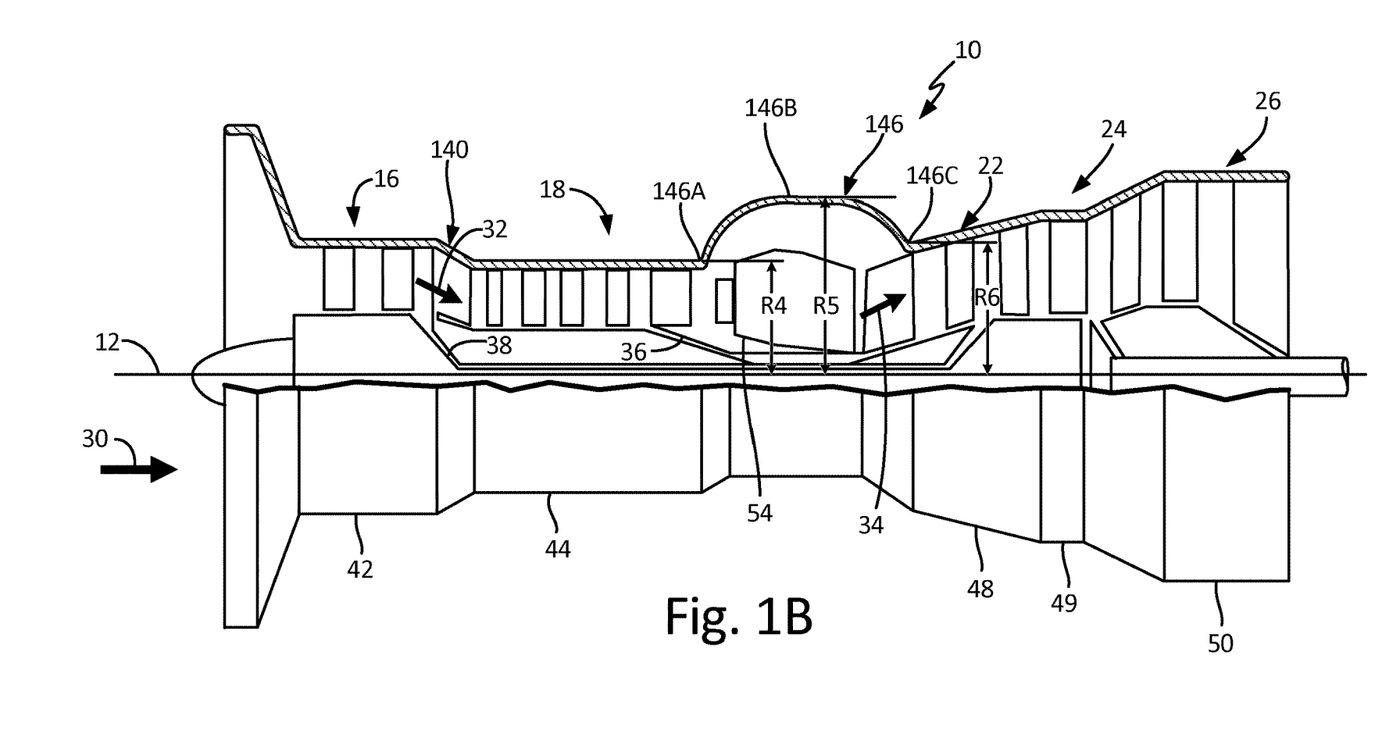
FIG. 1B is a side sectional schematic view of an industrial gas turbine engine having a case with a second embodiment of a case section with a convex bulge.

FIG. 1B is a side sectional schematic view of gas turbine engine 10 having case 140 with combustor case section 146. Combustor case section 146 is a convex bulge section similar to combustor case section 46 (shown in FIG. 1A), except combustor case section 146 has a substantially arc-shaped cross-section. The arc-shaped cross-section of combustor case section 146 is a relatively smooth, continuous curve. Combustor case section 146 can have a unitary construction or can include multiple, distinct cases. Intermediate case portion 146B has radius R5 with respect to engine centerline axis 12 that is larger than radius R4 of upstream case portion 146A and radius R6 of downstream case portion 146C.

Figure 1C:
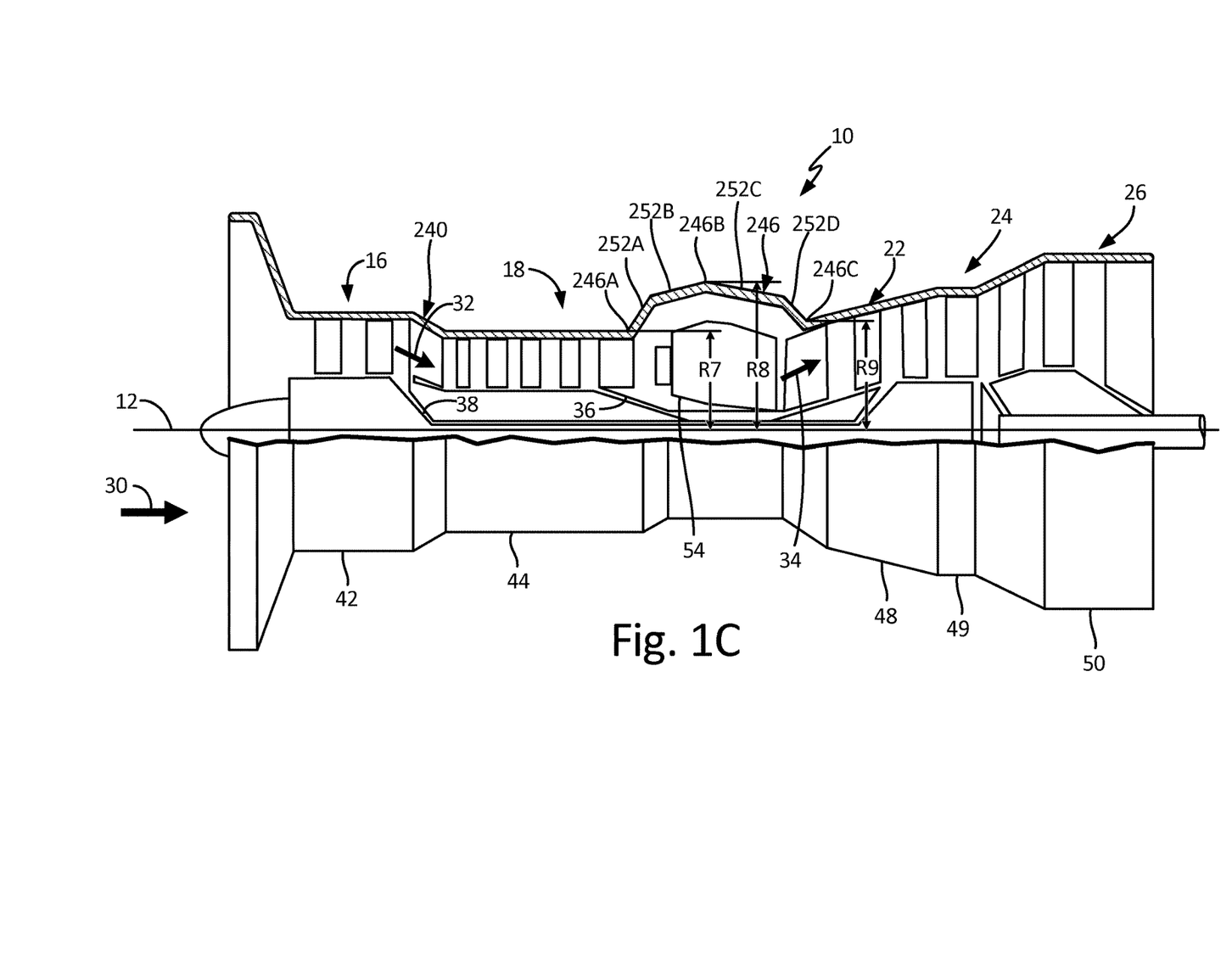
FIG. 1C is a side sectional schematic view of an industrial gas turbine engine having a case with a third embodiment of a case section with a convex bulge.

FIG. 1C is a side sectional schematic view of gas turbine engine 10 having case 240 with combustor case section 246. Combustor case section 246 is a convex bulge section similar to combustor case section 46 (shown in FIG. 1A), except combustor case section 246 has a substantially arc-shaped cross-section. Combustor case section 246 is a combination of four discrete conical cases 252A-252D. Intermediate case portion 246B has radius R8 with respect to engine centerline axis 12 that is larger than radius R7 of upstream case portion 246A and radius R9 of downstream case portion 246C.

Figure 1D:
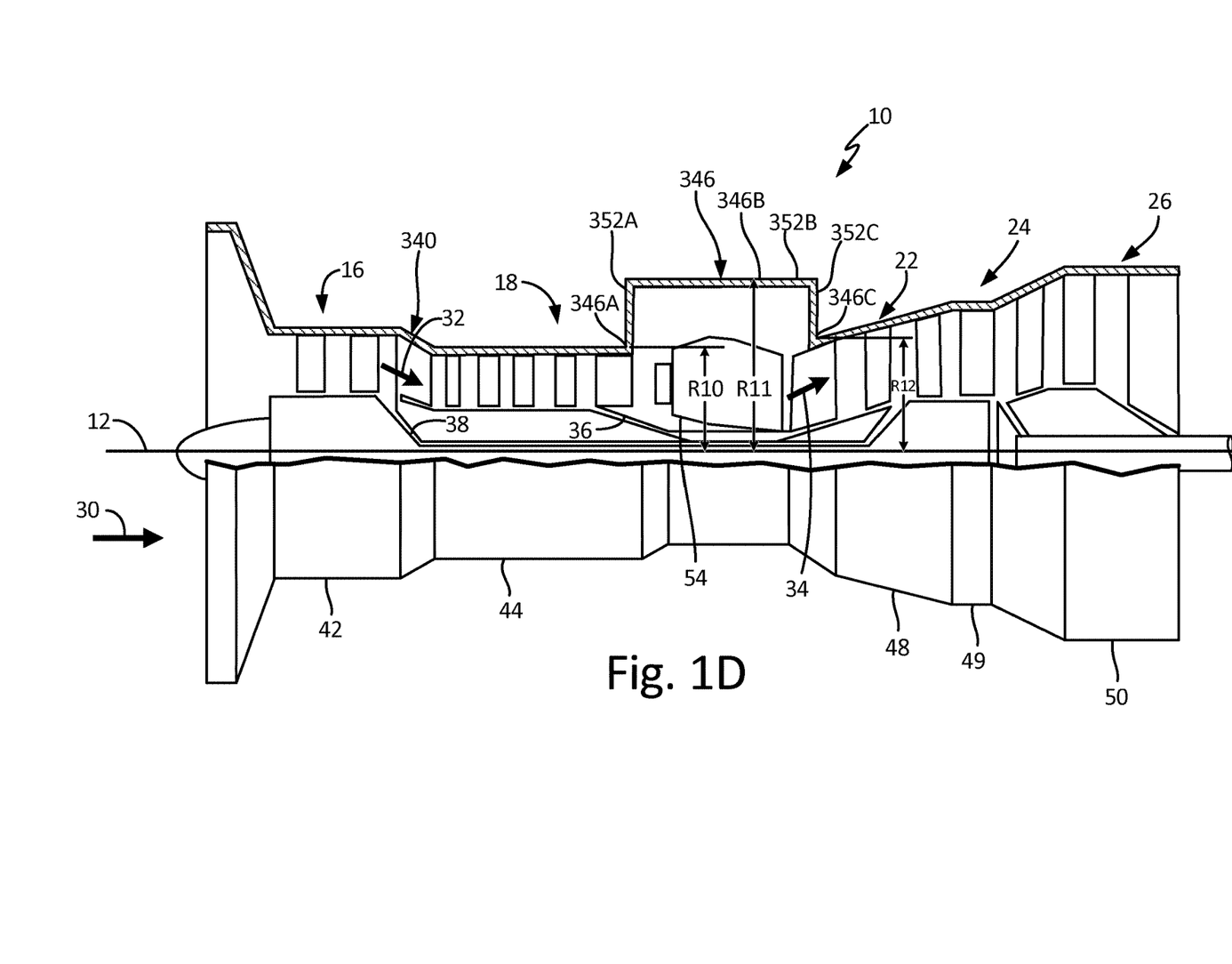
FIG. 1D is a side sectional schematic view of an industrial gas turbine engine having a case with a fourth embodiment of a case section with a convex bulge.

FIG. 1D is a side sectional schematic view of gas turbine engine 10 having case 340 with combustor case section 346. Combustor case section 346 is a convex bulge section similar to combustor case section 46 (shown in FIG. 1A), except combustor case section 346 has a substantially cylindrical bulge, circumferentially disposed about engine centerline axis 12. Combustor case section 346 is a combination of axially extending case 352B extending between radially extending cases 352A and 352C. Axially extending case 352B has a substantially constant radius R11. Intermediate case portion 346B is positioned on axially extending case 352B and has radius R11 with respect to engine centerline axis 12 that is larger than radius R10 of upstream case portion 346A and radius R12 of downstream case portion 346C.

Figure 2:
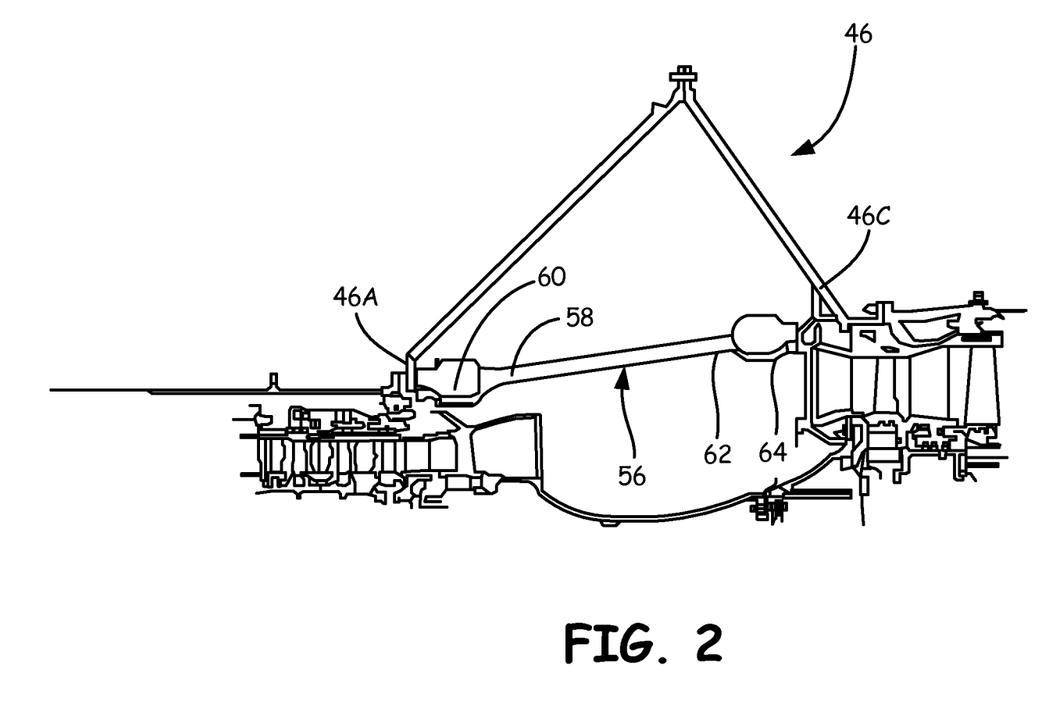
FIG. 2 is a side sectional schematic view of the case section of FIG. 1 and a tension rod.

FIG. 2 is a side sectional schematic view of combustor case section 46 and tension rod 56. First end 58 of tension rod 56 is connected to upstream case portion 46A via bracket 60. Second end 62 of tension rod 56 is connected to downstream case portion 46C via bracket 64. Tension rod 56 is one of a plurality of tie rods connected in tension between upstream case portion 46A and downstream case portion 46C. In embodiments with discrete cylindrical combustors 54 (shown in FIG. 1), each of tension rods 56 is positioned circumferentially between two of the discrete cylindrical combustors. Tension rods 56 provide axial tension to structurally support case 40. Tension rods 56 increase the axial stiffness of combustor case section 46, which, due to the convex shape of combustor case section 46, could otherwise have an undesirably reduced axial stiffness without tension rods.

The diameter of tension rod 56 can be selected to achieve a desired axial stiffness of combustor case section 46. The number of tension rods 56 can also be selected to achieve a desired axial stiffness of combustor case section 46. Tension rod 56 can be pre-stretched during assembly of gas turbine engine 10 such that tension rod 56 remains in tension during substantially all operating conditions.

Figure 3:
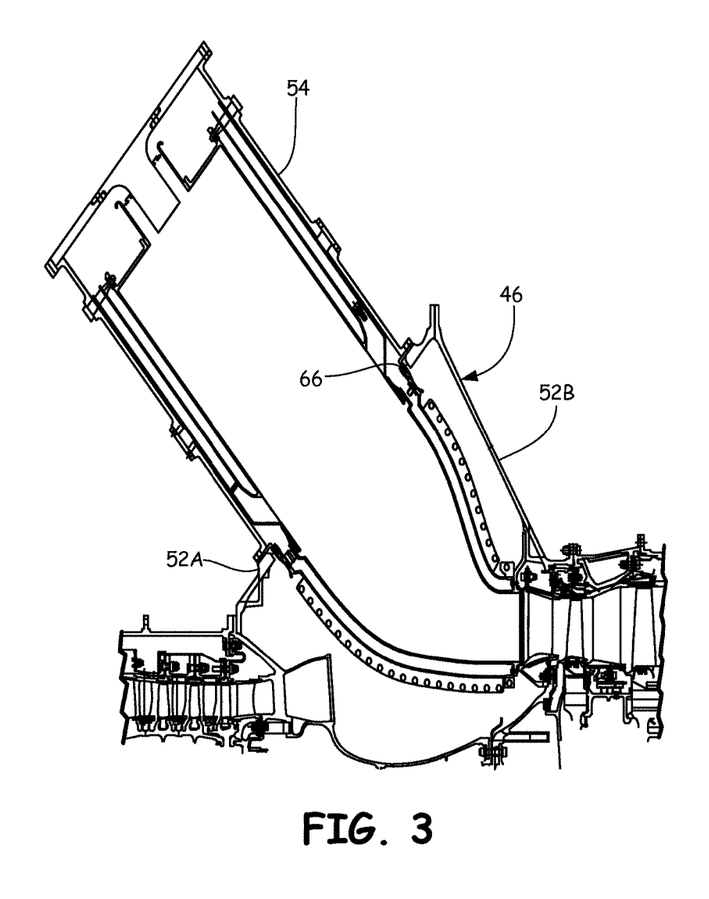
FIG. 3 is a side sectional schematic view of the case section of FIG. 1.

FIG. 3 is a side sectional schematic view of combustor case section 46. As illustrated in FIG. 3, the discrete cylindrical combustors 54 are angled so as to extend out through hole 66 in conical case 52A of combustor case section 46.

Figure 4:
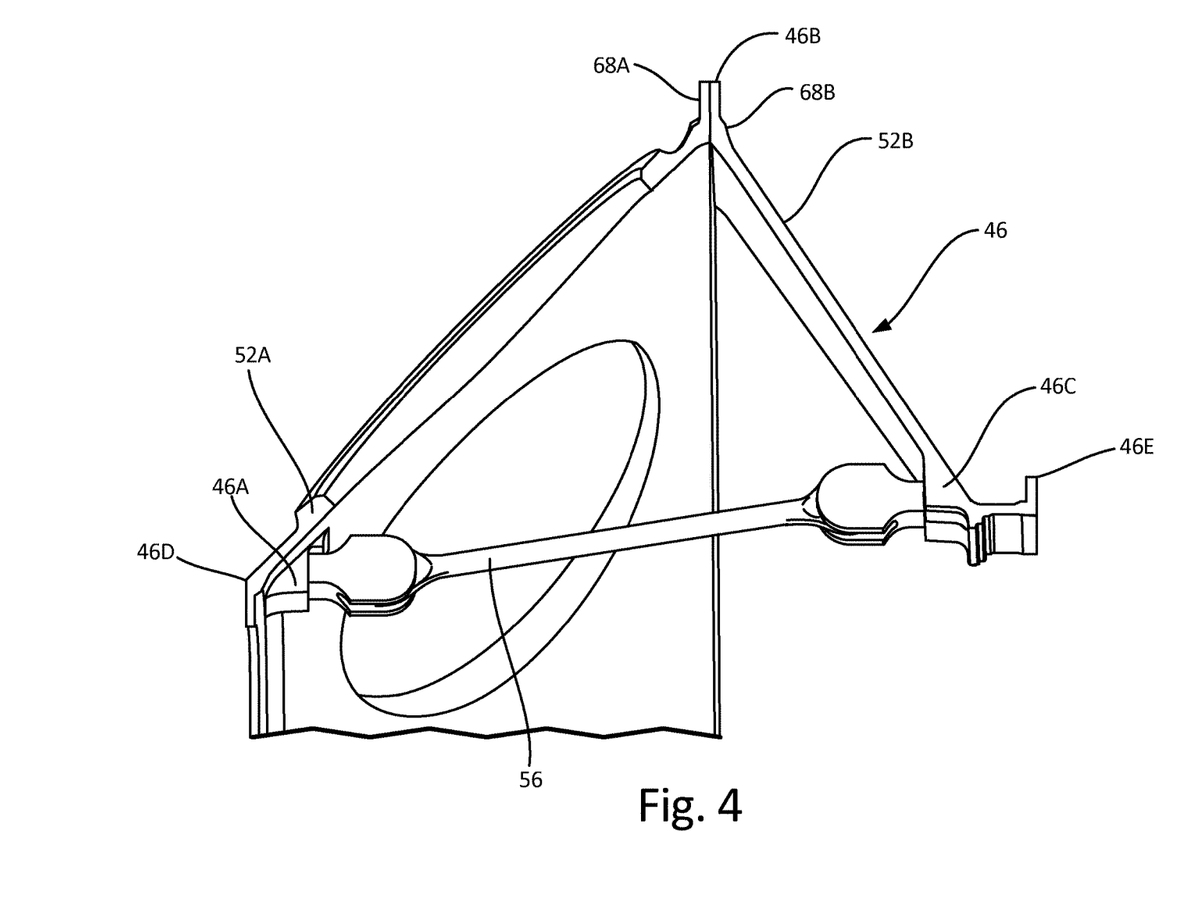
FIG. 4 is a side sectional schematic view of the case section of FIG. 1 and the tension rod.

FIG. 4 is a side sectional schematic view of combustor case section 46 and tension rod 56. FIG. 4 shows conical case 52A having flange 68A and conical case 52B having flange 68B. Flange 68A connects to flange 68B at intermediate case portion 46B. Combustor case section 46 has a maximum radius at the connection of flanges 68A and 68B. Tension rod 56 is connected to upstream case portion 46A and downstream case portion 46C. Upstream case portion 46A is adjacent forward edge 46D of combustor case section 46. Downstream case portion 46C is adjacent rearward edge 46E of combustor case section 46.

Figure 5:
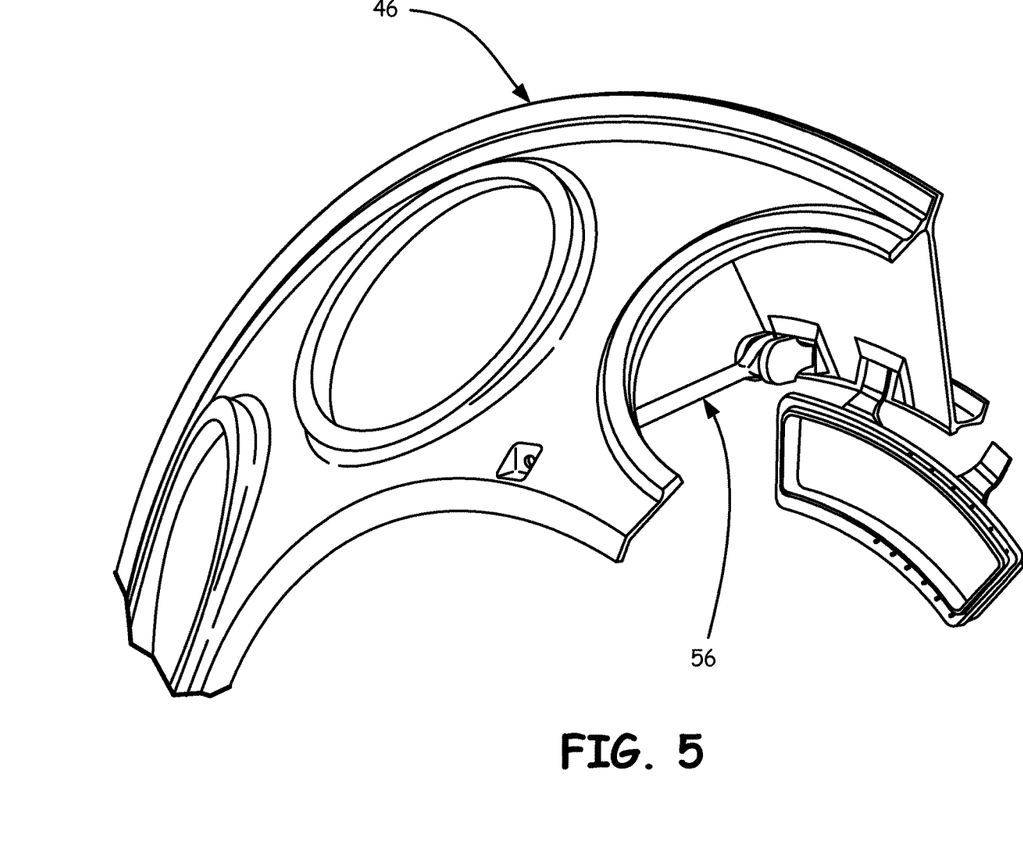
FIG. 5 is a perspective view of the case section of FIG. 1 and the tension rod.

FIG. 5 is a perspective view of another of combustor case section 46 and tension rod 56.

Because case 40 (and cases 140, 240, and 340) includes combustor case section 46 (and combustor case sections 146, 246, and 346) that bulges outward, combustor section 20 can be larger than some previous designs. The convex shape of combustor case section 46 allows for additional space, but can reduce the axial stiffness of combustor case section 46. Tension rods 56 extending from upstream case portion 46A to downstream case portion 46C increase axial stiffness of case 40. Thus, use of tension rods 56 allows combustor case section 46 to have a convex bulge while still maintaining adequate axial stiffness of case 40.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, while cases 40, 140, 240, and 340 are shown as having a convex bulge section at combustor case sections 46, 14, 246, and 346, in alternative embodiments, a convex bulge section can instead be included at one or more other sections of cases 40, 140, 240, and 340.

The invention claimed is:

1. A gas turbine engine comprising:
a convex case section comprising:
an upstream case portion adjacent a forward edge of the convex case section, wherein the upstream case portion has a first radius relative to a centerline axis of the gas turbine engine at the forward edge;
a downstream case portion adjacent a rearward edge of the convex case section, wherein the downstream case portion has a second radius relative to the centerline axis at the rearward edge;
an intermediate case portion between the upstream case portion and the downstream case portion and having a third radius relative to the centerline axis that is larger than the first radius and the second radius; and
a tension rod extending from the upstream case portion to the downstream case portion, wherein an entirety of the tension rod is disposed radially inward of the intermediate case portion relative to the centerline axis, and wherein a first end of the tension rod is connected to a first bracket mounted to the upstream case portion, and where a second end of the tension rod is connected to a second bracket mounted to the downstream case portion.

2. The gas turbine engine of claim 1, wherein the case comprises a combustor case at the convex case section.

3. The gas turbine engine of claim 2, and further comprising:
a plurality of cylindrical combustors positioned circumferentially around a centerline axis of the gas turbine engine.

4. The gas turbine engine of claim 3, wherein the tension rod is one of a plurality of tension rods connected to the upstream case portion and the downstream case portion, and wherein each of the plurality of tension rods is positioned circumferentially around the gas turbine engine between adjacent cylindrical combustors.

5. The gas turbine engine of claim 1, wherein the tension rod is one of a plurality of tension rods connected to the upstream case portion and the downstream case portion.

6. The gas turbine engine of claim 1, wherein the convex case section has a substantially arc-shaped cross-section.

7. The gas turbine engine of claim 1, wherein the convex case section comprises:
a first conical case having a first flange; and
a second conical case having a second flange connected to the first flange.

8. The gas turbine engine of claim 7, wherein the convex case section has a maximum radius at a connection of the first and second flanges.

9. The gas turbine engine of claim 1, wherein the case comprises a diffuser case at the convex case section.

10. The gas turbine engine of claim 1, wherein the tension rod comprises a single member between the first and second ends of the tension rod.

11. A gas turbine engine comprising:
a case extending circumferentially around the gas turbine engine, wherein the case comprises a bulge section having a maximum radius relative to a centerline axis of the gas turbine engine within an intermediate portion of the bulge section positioned between an upstream portion and a downstream portion of the bulge section; and
a tension rod having a first end connected to the upstream portion of the bulge section and a second end connected to the downstream portion of the bulge section, wherein an entirety of the tension rod is disposed radially inward of the intermediate portion of the bulge section.

12. The gas turbine engine of claim 11, wherein the case comprises a combustor case at the bulge section.

13. The gas turbine engine of claim 12, and further comprising:
a plurality of cylindrical combustors positioned circumferentially around a centerline axis of the gas turbine engine.

14. The gas turbine engine of claim 13, wherein the tension rod is one of a plurality of tension rods connected to the upstream portion and the downstream portion of the bulge section, and wherein each of the plurality of tension rods is positioned circumferentially between two of the cylindrical combustors.

15. The gas turbine engine of claim 11, wherein the tension rod is one of a plurality of tension rods connected to the upstream portion and the downstream portion of the bulge section.

16. The gas turbine engine of claim 11, wherein the bulge section has a substantially arc-shaped cross-section.

17. The gas turbine engine of claim 11, wherein the bulge section comprises:
a first conical case having a first flange; and
a second conical case having a second flange connected to the first flange.

18. The gas turbine engine of claim 17, wherein the maximum radius of the bulge section is at a connection of the first and second flanges.

19. The gas turbine engine of claim 11, wherein the case comprises a diffuser case at the bulge section.

* * * * *